(12) United States Patent  (10) Patent No.: US 8,713,172 B1
Linsley  (45) Date of Patent: Apr. 29, 2014

(54) IDENTIFICATION OF WEBSITES THAT BREAK OUT OF FRAMES

(75) Inventor: Peter Linsley, San Francisco, CA (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/468,322

(22) Filed: May 10, 2012

(51) Int. Cl.
*G06F 15/16* (2006.01)
*G06F 12/00* (2006.01)

(52) U.S. Cl.
USPC .................................... 709/224; 709/217

(58) Field of Classification Search
USPC ............. 709/223–229, 203, 217–218, 250
See application file for complete search history.

(56) References Cited

U.S. PATENT DOCUMENTS

| 7,051,289 | B1 * | 5/2006 | Yoshida | 715/784 |
| 8,112,717 | B1 * | 2/2012 | Akella et al. | 715/788 |
| 2004/0148307 | A1 * | 7/2004 | Rempell | 707/102 |
| 2006/0059133 | A1 * | 3/2006 | Moritani | 707/3 |
| 2008/0235214 | A1 * | 9/2008 | Sandberg et al. | 707/5 |

* cited by examiner

*Primary Examiner* — Zarni Maung
(74) *Attorney, Agent, or Firm* — Harrity & Harrity, LLP

(57) ABSTRACT

Websites or webpages that break frames may be automatically detected by determining a first value, based on a number of occurrences, that a child webpage and a container webpage are provided for presentation, the child webpage being presented within a frame of the container webpage. A second value may be determined, based on a number of occurrences, of user interaction data, indicating user interaction with the container webpage. The method may further include calculating a frame break score for the child webpage based on the first value and the second value and comparing the frame break score to a threshold. The method may further include identifying, based on the comparison to the threshold, the child webpage as a webpage that breaks frames.

21 Claims, 9 Drawing Sheets

| SITE | NUMBER SERVED CONTAINER WEBPAGES | NUMBER OF INTERACTIONS WITH CONTAINER WEBPAGE OPTIONS |
|---|---|---|
| EXAMPLE1.COM | 1205 | 120 |
| EXAMPLE2.COM | 6500 | 4 |
| EXAMPLE3.COM | 100000 | 8500 |
| EXAMPLE4.COM | 25000 | 3000 |

Fig. 5

IDENTIFICATION OF WEBSITES THAT BREAK OUT OF FRAMES

BACKGROUND

This specification relates to automatically identifying websites that break out of frames.

Many techniques are available to users today to find information on the world wide web ("web"). For example, users often use web browsers and/or search engines to find information of interest.

In response to user selection of a search result, some search engines present the user with an intermediate landing page instead of directly taking the user to the webpage corresponding to the search result. For example, an image search engine may display a number of thumbnail images as the results of an image search. In response to selection of a particular one of the thumbnail images, the search engine may transmit, to the user, an intermediate landing page, which may present the selected particular image along with one or more options relating to the particular image, such as an option to navigate to the website, that contains the image, or an option to search for similar images. The landing page may be structured using a frame, such as a hypertext markup language (HTML) frame, through which the website that hosts the image may be presented along with the landing page.

Some web pages are configured to allow webpages to break out of frames, also called frame busting. A website that breaks frames may include code, such as a script, that detects whether the webpage is being presented within a frame. In this situation, the webpage may set itself to be the top level frame, thus breaking out of the frame.

SUMMARY

Some implementations may be directed to a method that can include determining a first value, based on a number of occurrences, that a child webpage and a container webpage are provided for presentation, the child webpage being presented within a frame of the container webpage; determining a second value, based on a number of occurrences, of user interaction data, indicating user interaction with the container webpage; calculating a frame break score for the child webpage based on the first value and the second value; comparing, by the at least one of the one or more server devices, the frame break score to a threshold; and identifying, based on the comparison to the threshold, the child webpage as a webpage that breaks frames.

Some implementations may be directed to one or more computing devices comprising one or more memories to store instructions and one or more processors, to execute the instructions. The instructions can be executed to: determine a first value, based on a number of occurrences, that a child webpage and a container webpage are provided for presentation, the child webpage being presented within a frame of the container webpage; determine a second value, based on a number of occurrences, of user interaction data, indicating user interaction with the container webpage; calculate a frame break score for the child webpage based on the first value and the second value; compare the frame break score to a threshold; and identify, based on the comparison to the threshold, the child webpage as a webpage that breaks frames.

Some implementations may be directed to a computer-readable medium that can include one or more instructions, which when executed by one or more processors, cause one or more processors to determine a first value, based on a number of occurrences, that a child webpage and a container webpage are provided for presentation, the child webpage being presented within a frame of the container webpage; one or more instructions, which when executed by one or more processors, cause the one or more processors to determine a second value, based on a number of occurrences, of user interaction data, indicating user interaction with the container webpage; one or more instructions, which when executed by one or more processors, cause the one or more processors to calculate a frame break score for the child webpage based on the first value and the second value; one or more instructions, which when executed by one or more processors, cause the one or more processors to compare the frame break score to a threshold; and one or more instructions, which when executed by one or more processors, cause the one or more processors to identify, based on the comparison to the threshold, the child webpage as a webpage that breaks frames.

Techniques for determining whether webpages or websites break frames, as described herein, may advantageously be automatically performed to thus make the determination of whether webpages/websites break frames economically feasible for a large number of webpages/websites.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a diagram illustrating an example data structure relating to the determination of websites that break frames;

DETAILED DESCRIPTION

The following detailed description refers to the accompanying drawings. The same reference numbers in different drawings may identify the same or similar elements.

Overview

A website can provide, to a client, a webpage that includes a frame that contains information provided by a second website. For example, an image search engine can provide a selected image as part of a webpage, called a landing page, that includes one or more options relating to the selected image as well as a frame that provides the image from the website that hosts the selected image. Some webpages, such as webpages that host images, can break out of frames. It may be desirable to know whether a website is one that serves webpages that break out of frames. For instance, websites that contain images that are related to image search results, and that have been determined to be websites that serve webpages that break frames, may be handled differently than websites that do not break frames. As an example, the ranking of search results, corresponding to webpages from websites, may be altered when a website is determined to be one that breaks frames or a different technique may be used to provide content from the website to the user, such as by providing a link to the website without using frames.

Techniques described herein may automatically determine, based on a statistical analysis of data relating to user access patterns for websites, whether webpages and/or websites are ones that break frames.

Figure 1:
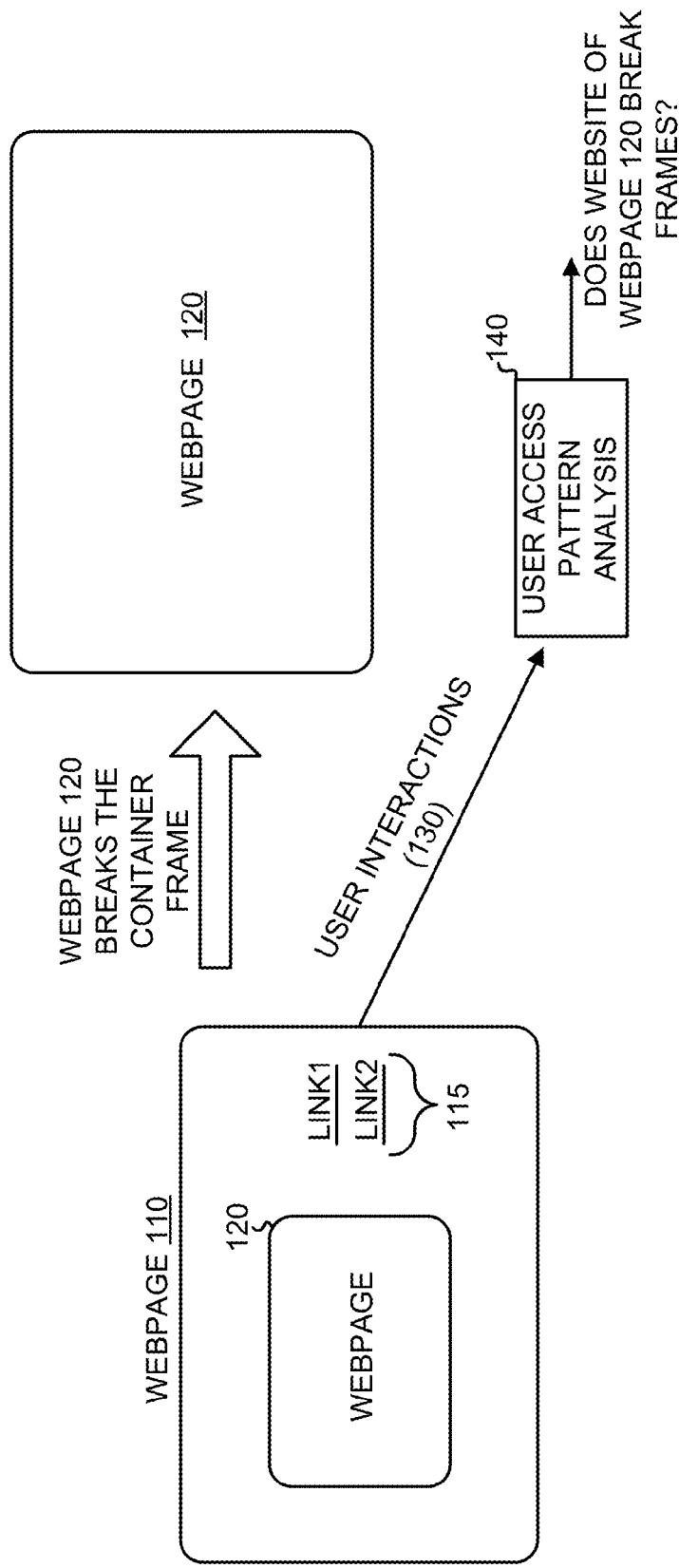
FIG. 1 is a diagram conceptually illustrating an example of the determination of whether a website breaks frames.

FIG. 1 is a diagram conceptually illustrating an example of the determination of whether a website breaks frames. A webpage 110 can be provided to a user, such as through a web browser program executed by a client device. Webpage 110 can provide a user with content and/or user input/selection options, such as links 115. Webpage 110 can also provide content from another webpage 120, such as a webpage associated with a website different than the website associated with webpage 110. Webpage 110 can act as a container for webpage 120. Webpage 120 can be presented, within webpage 110, using a container object such as an HTML frame. Webpage 120 may be a landing page for an image selected from a list of image search results.

Webpage 120 may be a webpage that breaks frames. In this situation, webpage 120 may break out of container webpage 110. From the user's perspective, when webpage 120 breaks out of the frame used by webpage 110, the main window of the user's browser may present only webpage 120. At this point, the user may no longer have access to the content associated with webpage 110 or be able to select links 115.

In some implementations, user interaction data, indicating user interaction with container webpage 110, can be processed. For example, user interaction data indicating selection of links 115 and/or the fact that container webpage 110 is presented, may be transmitted, as user interactions 130, to user access pattern analysis component 140. In some implementations, user interactions may be anonymous or obtained after receipt of user consent. User access pattern analysis component 140 may aggregate interactions from multiple users on a per-webpage or per-website basis. Based on the aggregated user interactions, user access pattern analysis component 140 may determine whether webpage 120, or the website associated with webpage 120, is one that breaks frames. The analysis performed by access pattern analysis component 140 may be based on the observation that webpages that break frames may be associated with very few or no selections of links 115, as the users may not have a chance to select links 115 before the frame provided by webpage 110 is broken. As shown in FIG. 1, the result of the analysis may be output as an indication of whether a particular website breaks frames (see FIG. 1, "DOES WEBSITE OF WEBPAGE 120 BREAK FRAMES?").

The concepts described herein may be applied to sets of documents. In some implementations, the documents may be images, such as images indexed by an image search engine. More generally, a document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a webpage. Documents often include textual information and may include embedded information, such as meta information, images, hyperlinks, etc., and/or embedded instructions, such as script, etc. A "link," as the term is used herein, is to be broadly interpreted to include any reference to a document from another document or another part of the same document.

System Overview

Figure 2:
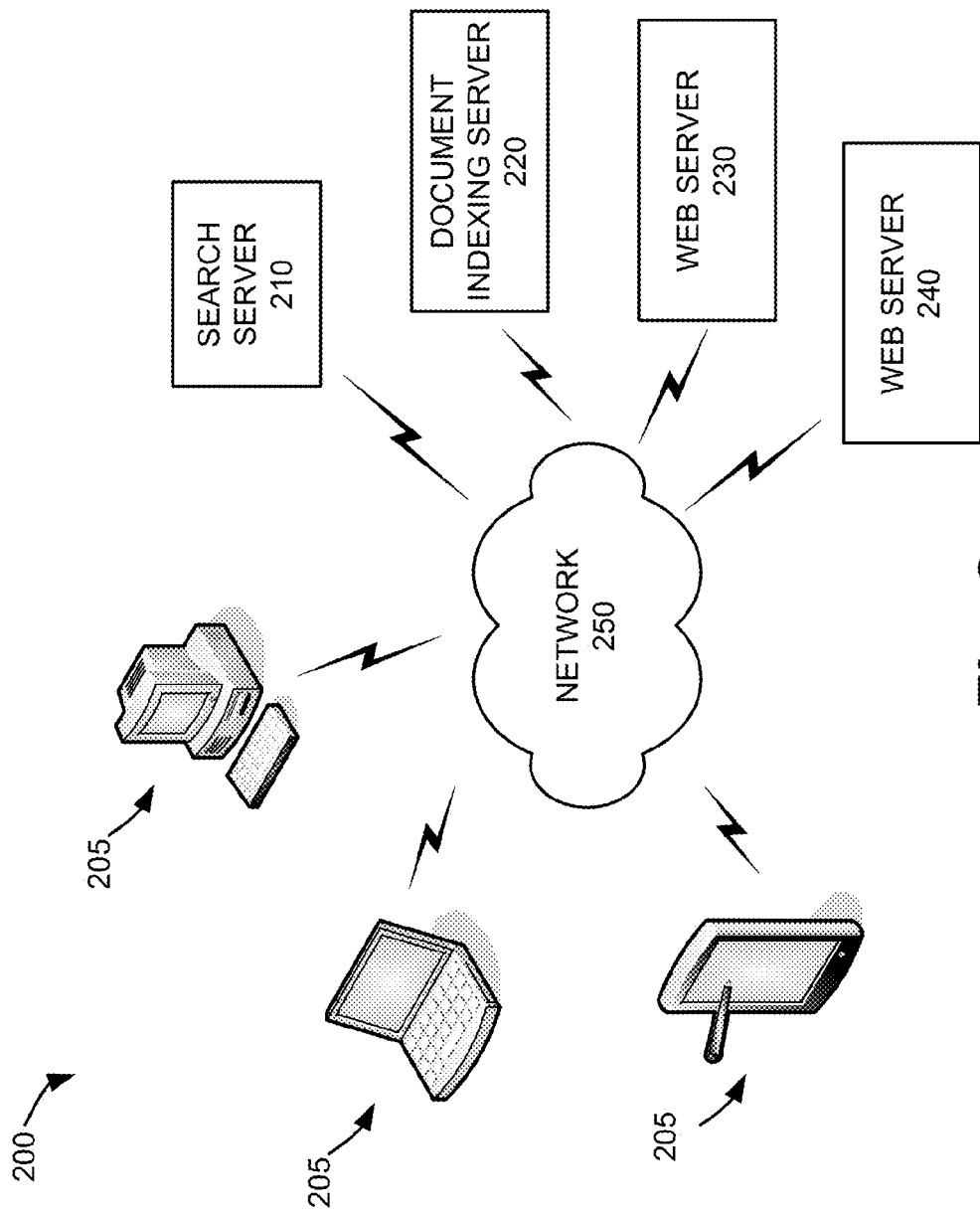
FIG. 2 is a diagram of an example environment in which techniques described herein may be implemented.

FIG. 2 is a diagram of an example environment 200 in which techniques described herein may be implemented. Environment 200 may include multiple clients 205 connected to one or more servers 210-240 via a network 250. In some implementations, and as illustrated, server 210 may be a search server, that may implement a search engine; and server 220 may be a document indexing server, e.g., a web crawler; and servers 230 and 240 may be general web servers, such as servers that provide content to clients 205. Clients 205 and servers 210-240 may connect to network 250 via wired, wireless, or a combination of wired and wireless connections.

Three clients 205 and four servers 210-240 are illustrated as connected to network 250 for simplicity. In practice, there may be additional or fewer clients and servers. Also, in some instances, a client may perform one or more functions of a server and a server may perform one or more functions of a client.

Clients 205 may include devices of users that access servers 210-240. A client 205 may include, for instance, a personal computer, a wireless telephone, a personal digital assistant (PDA), a laptop, a smart phone, a tablet computer, or another type of computation or communication device. Servers 210-240 may include devices that access, fetch, aggregate, process, search, provide, and/or maintain documents. Although shown as single components 210, 220, 230, and 240 in FIG. 2, each server 210-240 may, in some implementations, be implemented as multiple computing devices, which potentially may be geographically distributed.

Search server 210 may include one or more computing devices designed to implement a search engine, such as an image search engine, general webpage search engine, etc. Search server 210 may, for example, include one or more web servers to receive search queries from clients 205, search one or more databases in response to the search queries, and provide documents, relevant to the search queries, to clients 205. In some implementations, search server 210 may include an image search server that may provide webpages to clients 205, where a provided webpage may include a reference to a web server, such as one of web servers 230 or 240, at which the desired image is located and other information and/or links. The reference, to the web server at which the desired image is located, may be included in a frame.

Document indexing server 220 may include one or more computing devices designed to index documents available through network 250. Document indexing server 220 may access other servers, such as web servers that host content, to index the content. In some implementations, document indexing server 220 may index images stored by other servers, such as web servers 230 and 240, connected to network 250. Document indexing server 220 may, for example, locate images stored at other servers and index text that describes the images, such as text obtained from the filename of the image, text obtained from the webpage at which the image is hosted, or text obtained from metadata that is part of the image file. Document indexing server 220 may create a document index that stores information associated with the documents. The document index may be used by search server 210.

Web servers 230 and 240 may each include web servers that provide webpages to clients 205. The webpages may be, for example, HTML-based webpages. A web server 230/240 may host one or more websites. A website, as the term is used herein, may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

While servers 210-240 are shown as separate entities, it may be possible for one of servers 210-240 to perform one or more of the functions of the other one of servers 210-240. For example, it may be possible that two or more of servers 210-240 are implemented as a single server. It may also be possible for a single one of servers 210-240 to be implemented as two or more separate, and possibly distributed, devices.

Network 250 may include one or more networks of any type, such as a local area network (LAN), a wide area network (WAN), a metropolitan area network (MAN), a telephone network, such as the Public Switched Telephone Network (PSTN) or a Public Land Mobile Network (PLMN), an intranet, the Internet, or a combination of networks.

Although FIG. 2 shows example components of environment 200, in other implementations, environment 200 may contain fewer components, different components, differently arranged components, and/or additional components than those depicted in FIG. 2. Alternatively, or additionally, one or more components of environment 200 may perform one or more other tasks described as being performed by one or more other components of environment 200.

Figure 3:
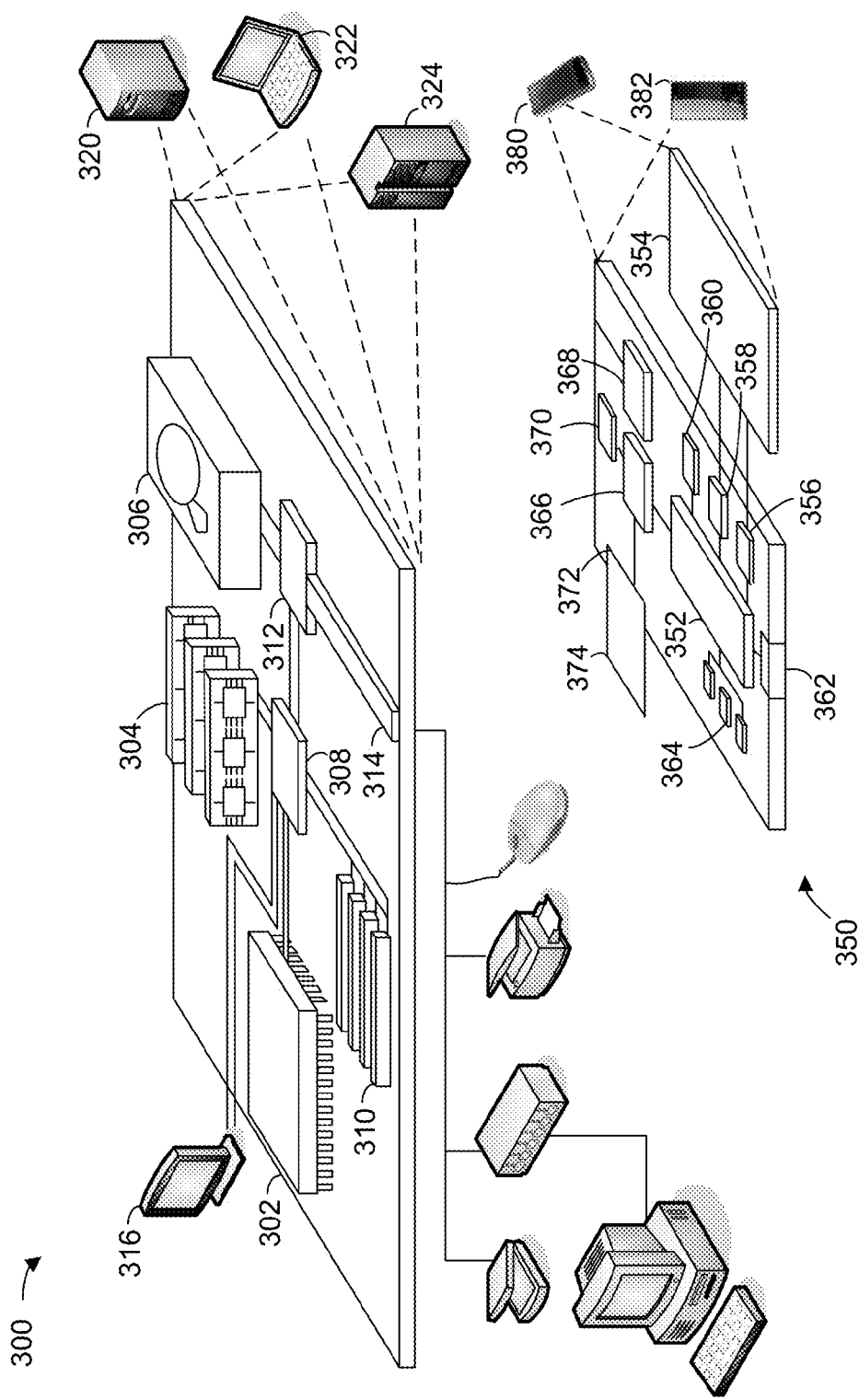
FIG. 3 is a diagram of an example of a generic computing device and a generic mobile computing device.

FIG. 3 is a diagram of an example of a generic computing device 300 and a generic mobile computing device 350, which may be used with the techniques described here. Generic computing device 300 or generic mobile computing device 350 may correspond to, for example, a client 205 and/or a server 210-240. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to memory 304 and high-speed expansion ports 310, and a low-speed interface 312 connecting to a low-speed expansion port 314 and a storage device 306. Each of components 302, 304, 306, 308, 310, 312, and 314, are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In some implementations, memory 304 includes a volatile memory unit or units. In another implementation, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is an example only. In some implementations, high-speed interface 308 is coupled to memory 304, display 316, such as through a graphics processor or accelerator, and to high-speed expansion ports 310, which may accept various expansion cards. In this implementation, low-speed interface 312 may be coupled to storage device 306 and low-speed expansion port 314. Low-speed expansion port 314, which may include various communication ports, such as a USB, Bluetooth, Ethernet, wireless Ethernet, etc., may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, computing device 300 may be implemented as a standard server 320, or multiple times in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, a memory 364, an input/output ("I/O") device, such as a display 354, a communication interface 366, and a transceiver 368, among other components. Mobile computing device 350 may also be provided with a storage device, such as a microdrive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver. In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert the received spoken information to digital information. Audio codec 360 may likewise generate audible sound for a user, such as through a speaker, e.g., in a handset of mobile computing device 350. Such sound may include sound from voice telephone calls, may include recorded sound, such as voice messages, music files, etc., and may also include sound generated by applications operating on mobile computing device 350.

Mobile computing device 350 may be implemented in a number of different forms, as shown in the figure. For example, mobile computing device 350 may be implemented as a cellular telephone 380. Mobile computing device 350 may also be implemented as part of a smart phone 382, personal digital assistant, or other similar mobile device.

Various implementations described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, such as magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the techniques described herein can be implemented on a computer having a display device, such as a CRT (cathode ray tube) or LCD (liquid crystal display) monitor, for displaying information to the user and a keyboard and a pointing device by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The techniques described herein can be implemented in a computing system that includes a back end component, such as a data server, or that includes a middleware component, such as an application server, or that includes a front end component, such as a client computer having a graphical user interface or a Web browser through which a user can interact with an implementation of the techniques described here, or any combination of such back end, middleware, or front end components. The components of the system can be interconnected by any form or medium of digital data communication. Examples of communication networks include a local area network ("LAN"), a wide area network ("WAN"), and the Internet.

Determination of Websites that Break Frames

Figure 4:
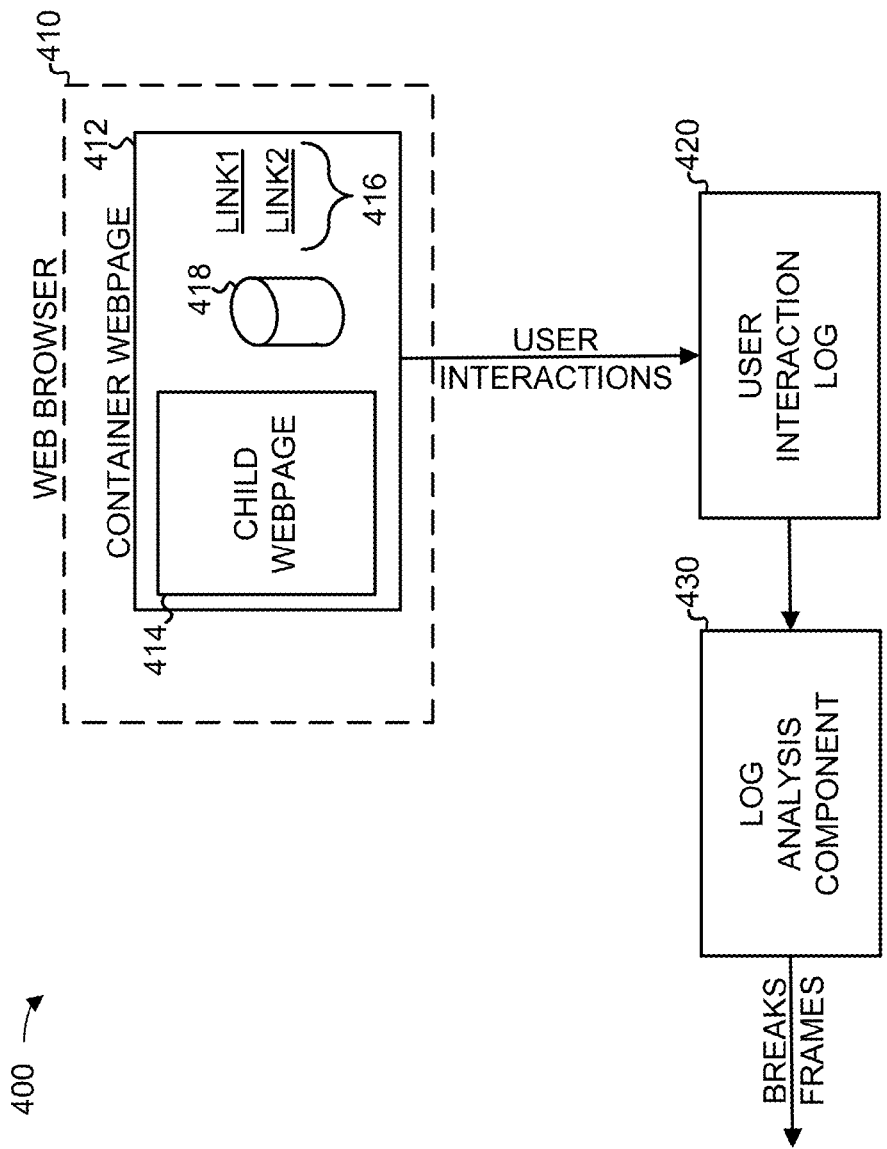
FIG. 4 is a diagram of example functional components relating to the determination of websites that break frames.

FIG. 4 is a diagram of example functional components 400 relating to the determination of websites that break frames. Functional components 400 may include a web browser 410, a user interaction log 420, and a log analysis component 430. In some implementations, web browser 410 may be implemented by a client 205. User interaction log 420 and log analysis component 430 may be implemented by a server, such as search server 210, or a combination of multiple servers.

Web browser 410 may provide one or more webpages to a user of client 205. Webpages may be provided in response to a user navigating to a webpage provided by a server, such as search server 210. As illustrated, assume web browser 410 renders a container webpage 412, which may be a webpage that references or "contains" another webpage. Container webpage 412 may use, for example, an HTML component, such as a frame, to contain the other webpage. The other webpage is illustrated, in FIG. 4, as child webpage 414.

In some implementations, and as previously mentioned, container webpage 412 may be a landing webpage returned from a search server 210, such as an image search engine. Child webpage 414 may be a reference to a webpage that provides a particular image, related to an image search result, that was selected by a user from a list of images provided in response to an image search.

In addition to child webpage 414, container webpage 412 may include additional elements, such as one or more links, text, input boxes, or other elements through which a user of client 205 may interact. The elements with which the user may interact, in container webpage 412, are generically illustrated in FIG. 4, as links 416. In some implementations in which webpage 412 is a landing webpage returned from an image search server, links 416 may include, for example, a link to initiate a search for images similar to an image that is included in child webpage 414, a link to show the image in child webpage 414 using a different resolution, and/or a link to take the user to a non-frame version of child webpage 414.

Container webpage 412 may additionally include logger 418, which may include logic to process user interactions with container webpage 412. In some implementations, logger 418 may include a script that is embedded in container webpage 412. In general, logger 418 may transmit feedback relating to user interactions with container webpage 412. For example, when container webpage 412 is first rendered by web browser 410, logger 418 may transmit a message, to user interaction log 420, that indicates that container webpage 412 has been loaded. Any user interaction with links 416, such as selection of links 416 by the user, may also be transmitted to user interaction log 420. Alternatively, in some implementations, logger 418 may not send a message, to user interaction log 420, indicating the loading of container webpage 412. Instead, this information, or equivalent information, may be obtained directly from the web server that provides container webpage 412. For instance, search server 210 may store an indication of how many times particular container webpages 412 are transmitted to clients 205. Additionally, links in container webpage 412 may refer back to search server 210, which may process the selection of the links instead of logger 418.

Although logger 418 was described above as being implemented by logic, such as a script, embedded in container webpage 412, in some implementations, logger 418 may be implemented differently. For example, logger 418 may be implemented within the code that defines web browser 410 or by a toolbar or other add-in software that operates in conjunction with web browser 410.

In some implementations, actions performed by logger 418 may only be performed when user consent has been given. Additionally, logger 418 may process user interactions as anonymous interactions.

User interaction log 420 may include logic to store the user interactions, as transmitted by logger 418. User interaction log 420 may use, for example, a database, file, or other data structure to store the user interactions.

Log analysis component 430 may receive the user interactions from user interaction log 420. Based on the user interactions, log analysis component 430 may determine whether websites break frames, such as, with reference to FIG. 4, whether child webpage 414, when provided as a frame within container webpage 412, will break out of container webpage 412 and be shown in the user's browser as a separate webpage. Log analysis component 430 may make this determination based on a statistical analysis of the user interactions stored by user interaction log 420. Log analysis component 430 may, for example, examine the quantity of user interactions associated with a number of websites. Websites that do not break frames may tend to have at least some users that interact with container webpage 412. In contrast, for websites that break frames, users may have little or no time to interact with container webpage 412. As a result, for these websites, the logged user interactions may be zero or near zero. Log analysis component 430 may determine whether a quantity of user interactions, with container webpage 412 of certain websites, are outliers, such as outliers that correspond to a very low number of user interactions relative to other websites. As an example, assume that a first container webpage averages one user interaction for each 100 times the first container webpage is served. Assume that most other container webpages that have other child webpages, however, average 50 user interactions, with a standard deviation of 20 user interactions, for each 100 times the container webpages are served. The child webpage, of the first container webpage, may be considered to be an outlier relative to the other webpages. The websites corresponding to these outlier webpages may be determined to be websites that break frames. For example, in some implementations, log analysis component 430 may determine a threshold number of interactions for each served instance of container webpage 412. Websites that are associated with one or more child webpages that average below the threshold, may be determined to be websites that break frames. In alternative possible implementations, log analysis component 430 may apply a clustering technique to cluster the user interaction data into two clusters, such as a low user interaction cluster and a normal user interaction cluster. Websites that are associated with one or more webpages corresponding to the cluster having a low number of user interactions, may be considered to be websites that break frames. In other alternative implementations, other techniques may be used by log analysis component 430, to analyze the user interactions, to determine webpages or websites that break frames.

As previously discussed, log analysis component 430 may operate on a per-website basis. For instance, if one or more webpages, or a threshold number or portion of webpages associated with a particular website, are determined to be webpages that break frames, the whole website may be categorized as a website that breaks frames. Alternatively, the analysis may be applied on a per-webpage basis. In this case, some webpages associated with a website may be determined to be webpages that break frames while other webpages associated with the same website may be determined to not break frames.

Although FIG. 4 shows an example of functional components 400, in other implementations, functional components 400 may contain fewer components, different components, differently arranged components, and/or additional components than those depicted in FIG. 4. Alternatively, or additionally, one or more functional components 400 may perform one or more other tasks described as being performed by one or more other functional components 400.

FIG. 5 is a diagram illustrating an example data structure 500, such as one that may be stored or maintained by user interaction log 420. In this example, user interaction log 420 may log, on a per-website basis, the number of container webpages that are served to clients 205 and the corresponding number of user interactions for the corresponding container webpages 412.

Data structure 500 may include a site field 510 that represents particular websites, a container webpage field 520, and a field 530 that may be used to store a count of the number of user interactions with the container webpages of websites. Entries in site field 510 may identify particular websites. In the example data structure 500, four websites, labeled as "example1.com," "example2.com," "example3.com," and "example4.com" are shown. Each website may be associated with one or more webpages. Entries in container webpage field 520 may each correspond to the number of times container webpages 412, for a particular website, are transmitted to clients 205. Entries in container webpage field 520 may, thus, represent a number of user opportunities to select links 416. Entries in field 530 may represent the total number of user interactions with the container webpages 412 corresponding to the entry. For the first entry shown in data structure 500, for instance, webpages associated with the website "example1.com" may have been transmitted, as child webpages 414, in corresponding container webpages 412, 1205 times. Of these 1205 opportunities for a user to interact with container webpages 412, 120 interactions may have been stored. In some implementations, the values in field 530 may represent the total number of container webpages 412 with which users interacted. In another possible implementation, the values in field 530 may represent the total number of interactions with container webpages 412, e.g., if a user selects two links 416 in a particular container webpage 412, the value in field 530 may be increased by two. As is further shown in FIG. 5, for the second entry shown in data structure 500, webpages associated with the website "example2.com" may have been transmitted, as child webpages 414, in corresponding container webpages 412, 6500 times. Of these 6505 opportunities for a user to interact with container webpages 412, 4 interactions may have been stored. For the third entry shown in data structure 500, webpages associated with the website "example3.com" may have been transmitted, as child webpages 414, in corresponding container webpages 412, 100000 times. Of these 100000 opportunities for a user to interact with container webpages 412, 8500 interactions may have been stored. For the fourth entry shown in data structure 500, webpages associated with the website "example4.com" may have been transmitted, as child webpages 414, in corresponding container webpages 412, 25000 times. Of these 25000 opportunities for a user to interact with container webpages 412, 3000 interactions may have been stored.

Figure 6:
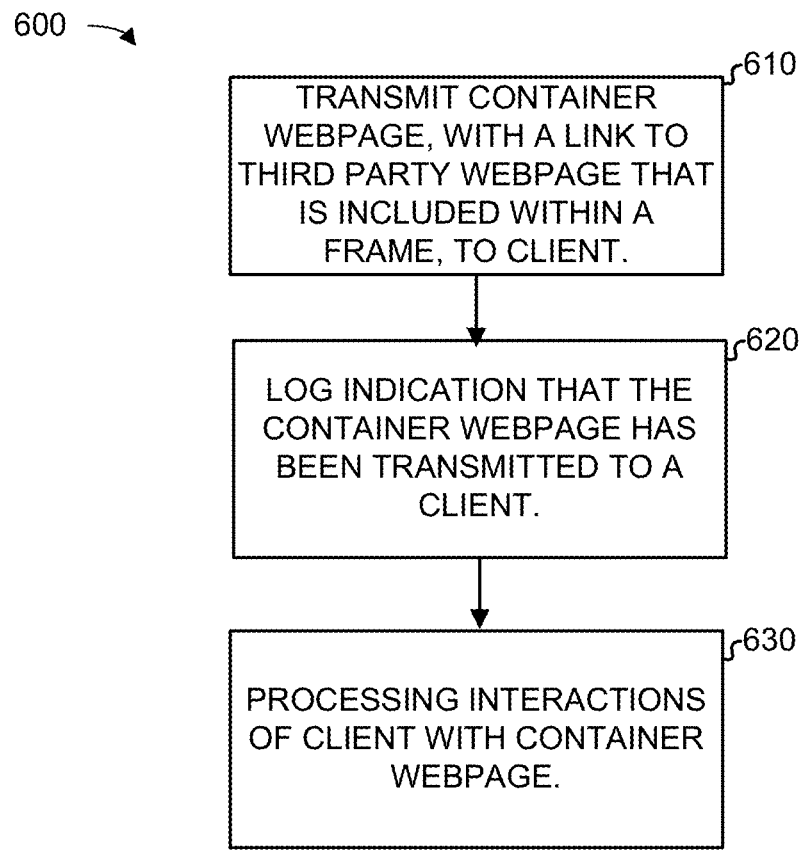
FIG. 6 is a flow chart illustrating an example process for logging user interactions with container webpages.

FIG. 6 is a flow chart illustrating an example process 600 for processing user interactions with container webpages 412. Process 600 may be performed by one or more servers, such as search server 210 and/or document indexing server 220, in communication with clients 205.

Process 600 may include transmitting a container webpage, such as container webpage 412, with a link or reference to a third-party webpage, such as child webpage 414, that is included within a frame, to a client 205 (block 610). As previously mentioned, in some implementations, the container webpage may include a container webpage 412 that is generated as a landing page that is initially provided to a client 205, in response to selection of a result for a search query, such as an image search query. The reference to the third-party webpage may cause all or a portion of the third-party webpage to be displayed within container webpage 412. For example, a particular image, that is stored by the third-party website, may be presented in child webpage 414.

Process 600 may further include logging an indication that the container webpage has been transmitted to a client 205 (block 620). In some implementations, a server, such as search server 210, may keep track of the number of times that the container webpage 412, containing a frame that references a particular webpage or website, is transmitted to a client 205. For example, search server 210 may update user interaction log 420 with counts of the quantity of times that a particular webpage or website was included within container webpages 412 that were provided to clients 205. Alternatively, container webpages 412 may include code, such as code or script within logger 418, that transmits an indication, to user interaction log 420, whenever container webpage 412 is first rendered or received by a client 205.

Process 600 may further include processing interactions of a user of client 205 with container webpage 412 (block 630). For instance, the number of interactions with elements of container webpage 412, such as links 416, may be transmitted, by logger 418, to user interaction log 420. Alternatively, instead of transmitting the quantity of times that a user interacts with elements of container webpage 412, only a first interaction may be transmitted to user interaction logging component 422. In another possible alternative implementation, instead of storing user interactions with elements of container webpage 412, logger 418 may wait for a particular time period to pass, such as a few seconds, before transmitting a message to user interaction log 420 to indicate that container webpage 412 is still an active page at client 205. In situations in which child webpage 414 breaks frames, logger 418 may be interrupted before the expiration of the particular time period, and logger 418 will, thus, not be able to transmit the message to user interaction log 420.

With the information received in blocks 620 and 630, user interaction log 420 may keep track of how often users tend to interact with webpages that are included within container webpage 412, such as by maintaining data structure 500. As previously mentioned, this information may be determined on a per-webpage or a per-website basis.

Figure 7:
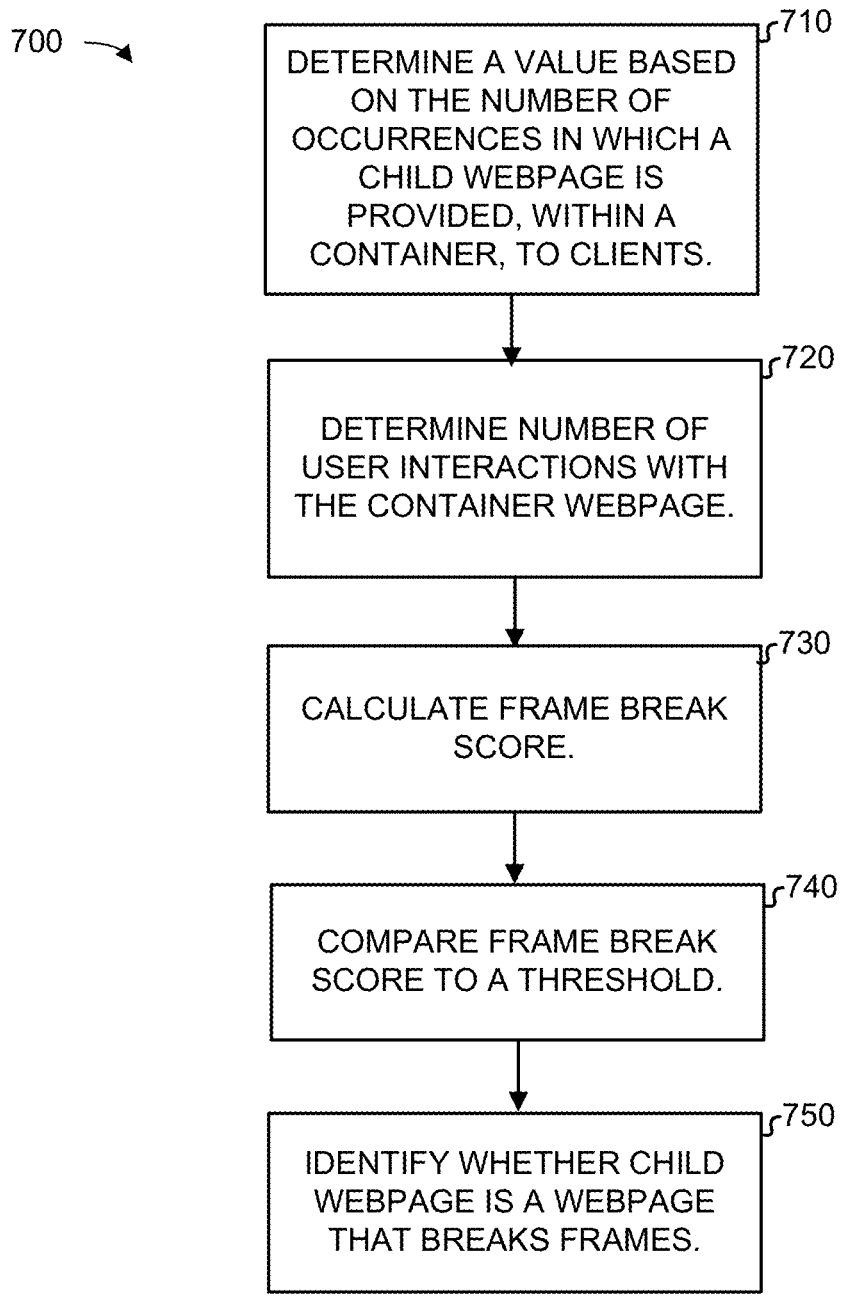
FIG. 7 is a flow chart illustrating an example process for determining whether a particular webpage or website is one that breaks frames.

FIG. 7 is a flow chart illustrating an example process 700 for determining whether a particular webpage or website is one that tends to break frames. Process 700 may be performed by one or more servers, such as search server 210 and/or document indexing server 220.

Process 700 may include determining a value based on the number of occurrences in which child webpage 414 was provided, within container webpage 412, to clients 205 (block 710). For instance, log analysis component 430 may obtain this information from user interaction log 420 as a count of the number of times that container webpage 412, for a particular webpage, is provided to clients 205. Alternatively, for a frame breaking analysis performed on a per-website basis, log analysis component 430 may obtain the number of times that a webpage, corresponding to a particular website, was provided, within a container webpage 412, to clients 205.

Process 700 may further include determining a second value, based on number of occurrences of user interactions with the container webpages that were provided to clients 205 (block 720). The second value may be equal to the number of times that users interacted with a container webpage corresponding to a particular webpage. Log analysis component 430 may obtain this information from user interaction log 420. The number of user interactions may correspond to interactions associated with particular child webpages. Alternatively, for a frame breaking analysis performed on a per-website basis, user interactions may be tracked on a per-website basis, such as the number of interactions associated with child webpages for a particular website.

In some implementations, a frame break score may be calculated based on the first and second values (block 730). The frame break score may be calculated based on the ratio of first and second values. For example, the frame break score may be calculated based on the ratio of fields 530 and 520. For example, with reference to FIG. 5, the website "example2.com" may be determined to have a frame break score of 0.0006 (4/6500). In other implementations, the frame break score may be calculated using other techniques.

Process 700 may further include comparing the frame break score to a threshold (block 740). In some implementations, the threshold may be manually chosen, such as by an administrator, as a value that tends to differentiate child webpages that break frames from child webpages that do not break frame. In other implementations, the threshold may be automatically determined, such as based on a statistical analysis of the data shown in FIG. 5. Process 700 may further include identifying whether the child webpage is a webpage that breaks frames (block 750). In some implementations, the identification may be based on a comparison of the frame break score to the threshold. If the frame break score is below the threshold, which may indicate that relatively few or zero user interactions are received from when a container webpage for a particular child webpage, the child webpage may be determined to be one that breaks frames. If the frame break score is above the threshold, the child webpage may be determined to be a webpage that does not break frames. In some implementations, if a child webpage is determined to break frames, the website corresponding to the child webpage may be correspondingly determined to be one that breaks frames.

In some implementations, instead of calculating a frame break score and comparing the frame break score to a threshold, other techniques may be used to determine whether a webpage or website is one that breaks frames. For example, this determination may be based on statistical analysis of the number of times child webpages, corresponding to a particular website, were provided to clients 205, relative to the number of user interactions with the container webpages that contained the child webpages. In general, the analysis may be based on the observation that websites that break frames will have relatively few user interactions, such as selections of links 416, with the container webpage relative to websites and/or webpages that do not break frames. The statistical analysis may include, for example, a statistical classification based on a clustering of the frame break scores or a statistical classification based on other techniques, such as decision trees, Bayesian networks, support vector machines, and/or neural networks.

Figure 8:
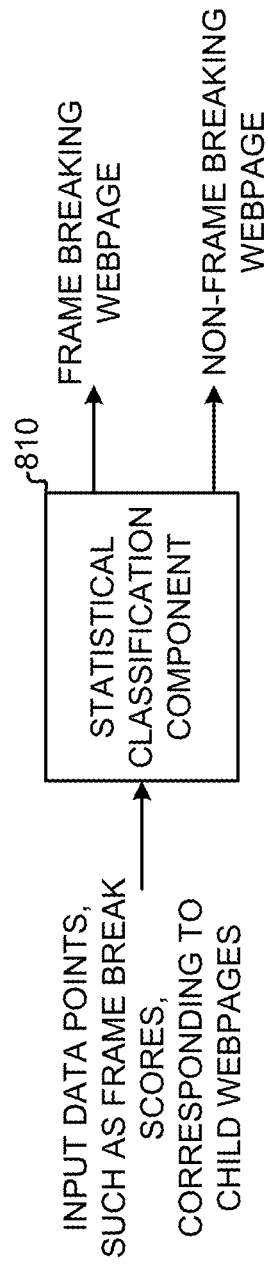
FIG. 8 is a diagram illustrating statistical classification to determine whether a webpage or website is one that breaks frames.

FIG. 8 is a diagram illustrating statistical classification to determine whether a webpage or website is one that breaks frames. As illustrated, a statistical classification component 810 may receive a number of input data points corresponding to user interaction data for container webpages corresponding to child webpages 414. For example, the input data points may include the frame break scores corresponding to a number of webpages. As previously discussed, the frame break score for a child webpage may be calculated as the ratio of the number of user interactions with a container webpage, containing the child webpage, relative to the number of times the container webpage was served to users. In some implementations, other data points, such as the raw data illustrated in FIG. 5, may be input to statistical classification component 810. Statistical classification component 810 may operate on the input data points to classify the input data points, and hence the corresponding child webpages corresponding to the input data points, as whether the webpages or websites are frame breaking webpages or non-frame breaking webpages. As previously mentioned, a number of statistical classification techniques are known that may be used to make the frame breaking/non-frame breaking decision, such as a threshold-based decision, clustering techniques, decision trees, Bayesian networks, support vector machines, neural networks, etc.

The stored indications of whether websites break frames may be used in a number of possible applications. For example, search server 210 may bias search result rankings based on whether a website breaks frames. Alternatively or additionally, search server 210 or a web server 230/240, may provide webpages differently based on whether a website is determined to break frames. For example, websites that are determined to break frames may not be provided within container webpages.

Figure 9:
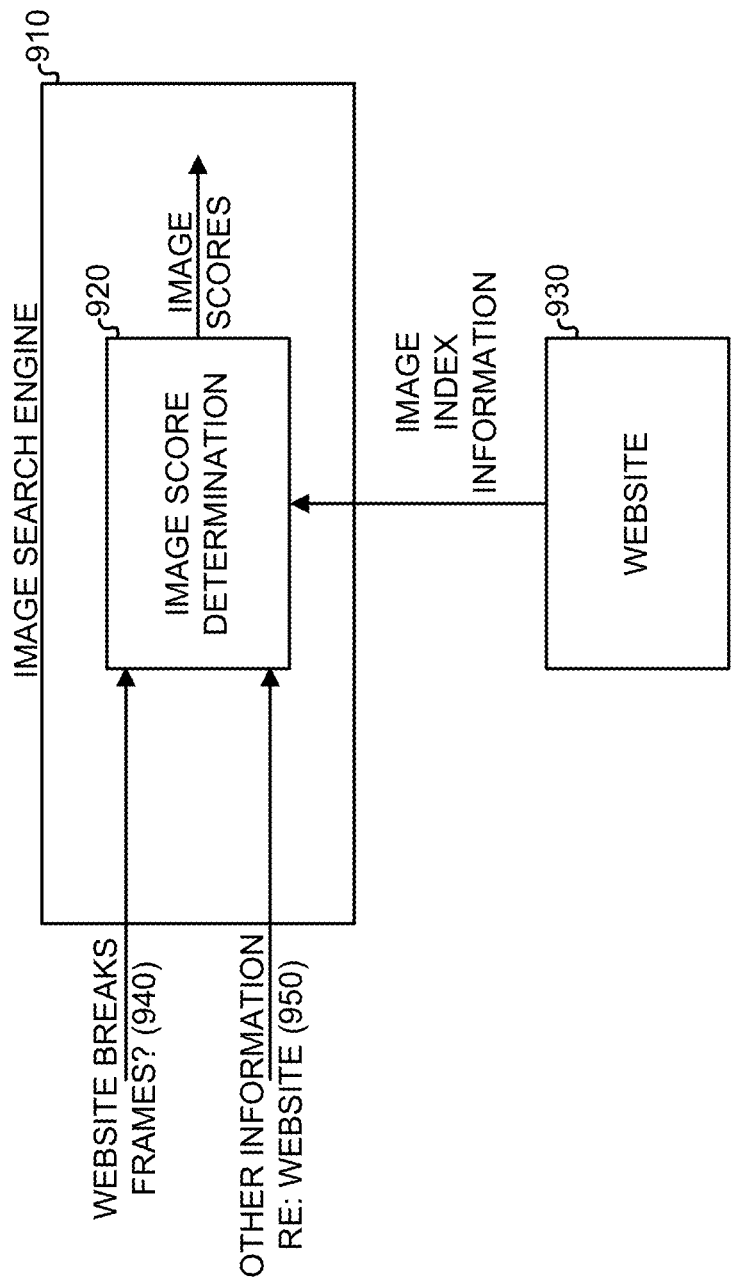
FIG. 9 is a diagram illustrating one example application that may use indications of whether websites break frames.

FIG. 9 is a diagram illustrating one example application that may use indications of whether websites break frames. In FIG. 9, an example implementation of an image search engine 910 is illustrated. Image search engine 910 may receive image index information from various websites, an example of which is illustrated as website 930. Image index information may include, for example, the uniform resource locator (URL) of an image associated with website 930.

Image search engine 910 may include an image score determination component 920. Image score determination component 920 may determine values (scores) for images provided by various websites, such as website 930. Each value may represent an estimated determination of the quality of an image and the value may be based on a number of factors. One factor may be whether the website was determined to be one that breaks frames (input signal 940). Other factors may be used by image score determination component 920 and are illustrated by input signal 950, which may represent other information relating to a website. For example, one other factor may be that higher resolution images may be considered to be higher quality images and may be assigned higher values. Another factor may be that images from websites that are determined to be reputable or of high quality may generally be associated with higher values. Another factor may be the age or date associated with images.

Based on the factors input to image score determination component 920, image score determination component 920 may determine a quality score for each of the indexed images. The quality score may be used to determine which images, and the relative ordering of the images, to provide in response to an image search. In some implementations, the quality score may be dynamically determined or modified based on a particular search query.

Techniques described herein may be used to automatically identify webpages that break frames or websites that tend to serve pages that break frames. The determination of whether a website/webpage breaks frames may be used in a number of potential applications, such as a ranking signal for an image search engine.

The foregoing description provides illustration and description, but is not intended to be exhaustive or to limit the embodiments to the precise form disclosed. Modifications and variations are possible in light of the above teachings or may be acquired from practice of these embodiments.

For example, while a series of blocks have been described with regard to FIGS. 6 and 7, the order of the blocks may be modified in other implementations. Further, non-dependent blocks may be performed in parallel. In addition, other blocks may be provided, or blocks may be eliminated, from the described flowcharts, and other components may be added to, or removed from, the described systems.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementation includes each dependent claim in combination with every other claim in the claim set.

No element, act, or instruction used in the present application should be construed as critical or essential to the disclosed embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   determining, by at least one of the one or more server devices, a first value, based on a number of occurrences that a child webpage and a container webpage are provided for presentation,
      the child webpage being presented within a frame of the container webpage;
   determining, by the at least one of the one or more server devices, a second value, based on a number of occurrences, of user interaction with the container webpage;
   calculating, by the at least one of the one or more server devices, a frame break score for the child webpage based on the first value and the second value;
   comparing, by the at least one of the one or more server devices, the frame break score to a threshold; and
   identifying, by the at least one of the one or more server devices and based on the comparison to the threshold, the child webpage as a webpage that breaks frames.

2. The method of claim 1, further comprising:
   generating the container webpage to include:
      at least one selectable link, and
      the frame including the child webpage.

3. The method of claim 1, further comprising:
   determining, based on the child webpage being identified as the webpage that breaks frames, that a website, associated with the child webpage, breaks frames.

4. The method of claim 1, further comprising:
   determining a score for an image, in response to a search query, based on the child webpage being identified as the webpage that breaks frames.

5. The method of claim 1, where calculating the frame break score includes:
   calculating the frame break score as a ratio of the second value and the first value.

6. The method of claim 1, further comprising:
   performing a statistical analysis based on the first value and the second value corresponding to a plurality of child webpages and container webpages.

7. The method of claim 1, where the frame of the webpage includes a hyper-text markup language (HTML) webpage that includes an HTML frame object.

8. One or more computing devices comprising:
   one or more memories to store instructions; and
   one or more processors, to execute the instructions, to:
      determine a first value, based on a number of occurrences, that a child webpage and a container webpage are provided for presentation,
         the child webpage being presented within a frame of the container webpage;
      determine a second value, based on a number of occurrences, of user interaction data, indicating user interaction with the container webpage;
      calculate a frame break score for the child webpage based on the first value and the second value;
      compare the frame break score to a threshold; and
      identify, based on comparing the frame break score to the threshold, the child webpage as a webpage that breaks frames.

9. The one or more computing devices of claim 8, where the one or more processors further execute the instructions to:
   generate the container webpage to include:
      at least one selectable link, and
      the frame object including the child webpage.

10. The one or more computing devices of claim 8, where the one or more processors further execute the instructions to:
    determine, based on the child webpage being identified as the webpage that breaks frames, that a website, associated with the child webpage, breaks frames.

11. The one or more computing devices of claim 8, where the one or more processors further execute the instructions to:
    determine a score of an image, in response to a search query, based on the child webpage being identified as the webpage that breaks frames.

12. The one or more computing devices of claim 8, where, when calculating the frame break score, the one or more processors further execute the instructions to:
    calculate the frame break score as a ratio of the second value and the first value.

13. The one or more computing devices of claim 8, where, when identifying the child webpage as the webpage that breaks frames, the one or more processors further execute the instructions to:
    perform a statistical analysis, to identify whether the child webpage breaks frames, based on the first value and the second value corresponding to a plurality of child webpages and container webpages.

14. The one or more computing devices of claim 8, where the frame of the webpage includes a hyper-text markup language (HTML) webpage that includes an HTML frame object.

15. A non-transitory computer-readable medium storing instructions, the instructions comprising:
 one or more instructions which, when executed by one or more processors, cause the one or more processors to determine a first value, based on a number of occurrences, that a child webpage and a container webpage are provided for presentation,
 the child webpage being presented within a frame of the container webpage;
 one or more instructions which, when executed by the one or more processors, cause the one or more processors to determine a second value, based on a number of occurrences, of user interaction data, indicating user interaction with the container webpage;
 one or more instructions which, when executed by the one or more processors, cause the one or more processors to calculate a frame break score for the child webpage based on the first value and the second value;
 one or more instructions which, when executed by the one or more processors, cause the one or more processors to compare the frame break score to a threshold; and
 one or more instructions which, when executed by the one or more processors, cause the one or more processors to identify, based on comparing the frame break score to the threshold, the child webpage as a webpage that breaks frames.

16. The non-transitory computer-readable medium of claim 15, where the instructions further comprise one or more instructions to:
 generate the container webpage to include:
 at least one selectable link, and
 the frame including the child webpage.

17. The non-transitory computer-readable medium of claim 15, where the instructions further comprise one or more instructions to:
 determine, based on the child webpage being identified as the webpage that breaks frames, that a website, associated with the child webpage, breaks frames.

18. The non-transitory computer-readable medium of claim 15, where the instructions further comprise one or more instructions to:
 determine a score of an image, in response to a search query, based on the child webpage being identified as the webpage that breaks frames.

19. The non-transitory computer-readable medium of claim 15, where the one or more instructions to calculate the frame break score include:
 one or more instructions to calculate the frame break score as a ratio of the second value and the first value.

20. The non-transitory computer-readable medium of claim 15, where the one or more instructions to identify the child webpage as the webpage that breaks frames include one or more instructions to:
 perform a statistical analysis, to identify whether the child webpage breaks frames, based on the first value and the second value corresponding to a plurality of child webpages and container webpages.

21. The non-transitory computer-readable medium of claim 15, where the frame of the webpage includes a hyper-text markup language (HTML) webpage that includes an HTML frame object.

* * * * *